(12) United States Patent
Park et al.

(10) Patent No.: US 10,923,203 B2
(45) Date of Patent: Feb. 16, 2021

(54) SEMICONDUCTOR DEVICE AND METHOD OF OPERATING SEMICONDUCTOR DEVICE

(71) Applicant: SAMSUNG ELECTRONICS CO., LTD., Suwon-si (KR)

(72) Inventors: Keun Young Park, Seongnam-si (KR); Dong Jin Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 249 days.

(21) Appl. No.: 16/106,267

(22) Filed: Aug. 21, 2018

(65) Prior Publication Data

US 2019/0214102 A1 Jul. 11, 2019

(30) Foreign Application Priority Data

Jan. 10, 2018 (KR) .................... 10-2018-0003456

(51) Int. Cl.
*G11C 17/16* (2006.01)
*G06F 21/33* (2013.01)
(Continued)

(52) U.S. Cl.
CPC .......... *G11C 17/16* (2013.01); *G06F 11/3648* (2013.01); *G06F 21/33* (2013.01);
(Continued)

(58) Field of Classification Search
CPC ....... G11C 17/16; G11C 16/10; G11C 17/143; G11C 7/24; G11C 17/18; H04L 9/0894;
(Continued)

(56) References Cited

U.S. PATENT DOCUMENTS 7,757,295 B1 * 7/2010 Hadaaegh ............. G06F 21/552
726/26
8,644,499 B2 * 2/2014 Kothari ................... G06F 21/33
380/2
(Continued)

FOREIGN PATENT DOCUMENTS

KR 1020170093847 8/2017
WO 2016091837 6/2016

OTHER PUBLICATIONS

US 9,734,338 B2, 08/2017, Jang et al. (withdrawn)

*Primary Examiner* — J. Brant Murphy
(74) *Attorney, Agent, or Firm* — F. Chau & Associates, LLC

(57) ABSTRACT

A semiconductor device includes a one-time programmable (OTP) memory including a key program area and a plurality of key protection setting areas. A key is stored in the key program area, and a plurality of setting values that protect the key stored in the key program area are programmed in the key protection setting areas. The semiconductor device further includes a key register and a key protection control logic circuit. The key register is configured to load the key stored in the OTP memory. The key is accessible to secure software when the key is loaded into the key register. The key protection control logic circuit is configured to load the key stored in the OTP memory into the key register based on the setting values programmed in the key protection setting areas of the OTP memory.

20 Claims, 10 Drawing Sheets

(51) Int. Cl.
- *G11C 16/10* (2006.01)
- *G06F 21/76* (2013.01)
- *H04L 9/14* (2006.01)
- *G06F 11/36* (2006.01)
- *H04L 9/08* (2006.01)
- *G09C 1/00* (2006.01)
- *H04L 9/32* (2006.01)

(52) U.S. Cl.
CPC ............... *G06F 21/76* (2013.01); *G09C 1/00* (2013.01); *G11C 16/10* (2013.01); *H04L 9/0894* (2013.01); *H04L 9/14* (2013.01); *H04L 9/3247* (2013.01)

(58) Field of Classification Search
CPC .......... H04L 9/3247; H04L 9/14; G09C 1/00; G06F 21/33; G06F 21/76; G06F 11/3648; G06F 21/79

See application file for complete search history.

(56) References Cited

U.S. PATENT DOCUMENTS

| | | | |
|---|---|---|---|
| 9,208,357 B1* | 12/2015 | Langhammer | G06F 21/76 |
| 9,293,220 B2* | 3/2016 | Chung | G11C 29/028 |
| 9,380,246 B2* | 6/2016 | Lee | H04N 5/378 |
| 9,390,246 B2 | 7/2016 | Tamminen et al. | |
| 9,436,846 B2* | 9/2016 | Hartley | G06F 21/575 |
| 9,501,429 B2* | 11/2016 | Zheng | G06F 12/1408 |
| 10,521,618 B1* | 12/2019 | Zhang | H04L 9/0869 |
| 2006/0002561 A1* | 1/2006 | Choi | H04L 9/0822 380/277 |
| 2007/0094507 A1* | 4/2007 | Rush | H04W 12/1006 713/176 |
| 2008/0148001 A1* | 6/2008 | Gehrmann | G06F 21/572 711/164 |
| 2011/0141791 A1* | 6/2011 | Ahmed | G11C 17/18 365/94 |
| 2013/0019110 A1* | 1/2013 | Lee | H04L 63/0823 713/193 |
| 2014/0164753 A1* | 6/2014 | Lee | G06F 21/575 713/2 |
| 2014/0201540 A1* | 7/2014 | Li | H04L 9/0891 713/193 |
| 2016/0140357 A1* | 5/2016 | Newell | G06F 21/79 726/2 |
| 2016/0315765 A1* | 10/2016 | Zheng | G06F 21/6209 |
| 2016/0321438 A1 | 11/2016 | Tamminen et al. | |
| 2017/0053716 A1* | 2/2017 | Kim | G11C 29/24 |
| 2018/0034625 A1* | 2/2018 | Hunacek | G06F 21/556 |
| 2018/0321438 A1* | 11/2018 | Bookbinder | G02B 6/02219 |

* cited by examiner

SEMICONDUCTOR DEVICE AND METHOD OF OPERATING SEMICONDUCTOR DEVICE

CROSS-REFERENCE TO RELATED APPLICATIONS

This application claims priority under 35 U.S.C. § 119 to Korean Patent Application No. 10-2018-0003456 filed on Jan. 10, 2018, the disclosure of which is incorporated by reference herein in its entirety.

TECHNICAL FIELD

Exemplary embodiments of the present disclosure relate to a semiconductor device and a method of operating a semiconductor device.

DISCUSSION OF THE RELATED ART

A semiconductor device capable of executing secure software, including a secure application, stores a key therein and permanently programs the key used by the secure software. For example, during a process of fabricating a chip or chipset to be mounted on the semiconductor device, a value of a key may be fused in an element such as, for example, a one-time programmable (OTP) memory included in the semiconductor device.

However, when a chip is distributed to another place or a product is developed using the chip after the fabrication process is completed, a non-authorized third party may access the key that is fused in the chip without permission and leak the key.

SUMMARY

Exemplary embodiments of the present disclosure provide a semiconductor device that prevents a key fused in a one-time programmable (OTP) memory from leaking before secure features are enabled.

Exemplary embodiments of the present disclosure also provide a method of operating a semiconductor device that prevents a key fused in an OTP memory from leaking before secure features are enabled.

According to an exemplary embodiment of the present disclosure, a semiconductor device includes an OTP memory including a key program area and a plurality of key protection setting areas. A key is stored in the key program area, and a plurality of setting values that protect the key stored in the key program area are programmed in the key protection setting areas. The semiconductor device further includes a key register and a key protection control logic circuit. The key register is configured to load the key stored in the OTP memory. The key is accessible to secure software when the key is loaded into the key register. The key protection control logic circuit is configured to load the key stored in the OTP memory into the key register based on the setting values programmed in the key protection setting areas of the OTP memory.

According to an exemplary embodiment of the present disclosure, a semiconductor device includes an OTP memory including a key program area and a plurality of key protection setting areas. A key is stored in the key program area, and a plurality of setting values that protect the key stored in the key program area are stored in the key protection setting areas. The semiconductor device further includes a key register and a key protection control logic circuit. The key register is configured to load the key stored in the OTP memory. The key is accessible to secure software when the key is loaded into the key register. The key protection control logic circuit is configured to perform one or more logic operations on the setting values stored in the key protection setting areas of the OTP memory. The key protection control logic circuit determines whether to load the key stored in the OTP memory into the key register based on a result of performing the one or more logic operations.

According an exemplary embodiment of the present disclosure, a method of operating a semiconductor device includes receiving, by a key protection control logic circuit included in the semiconductor device, one or more setting values from one or more key protection setting areas of an OTP memory included in the semiconductor device. The method further includes performing, by the key protection control logic circuit, one or more logic operations on the one or more setting values. The method further includes determining, by the key protection control logic circuit, whether to load a key stored in the OTP memory into a key register included in the semiconductor device based on a result of performing the one or more logic operations.

According to an exemplary embodiment of the present disclosure, a semiconductor device includes an OTP memory including a key program area and a plurality of key protection setting areas. A key is stored in the key program area, and a plurality of setting values that protect the key stored in the key program area are programmed in the key protection setting areas. The semiconductor device further includes a key register configured to load the key stored in the OTP memory. The key program area of the OTP memory is not accessible to secure software, the key register is accessible to the secure software, the key is not accessible to the secure software when the key is stored in the key program area and is not loaded into the key register, and the key is accessible to the secure software when the key is loaded into the key register. The semiconductor device further includes a key protection control logic circuit configured to load the key stored in the OTP memory into the key register based on the setting values programmed in the key protection setting areas of the OTP memory.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF THE EXEMPLARY EMBODIMENTS

Figure 1:
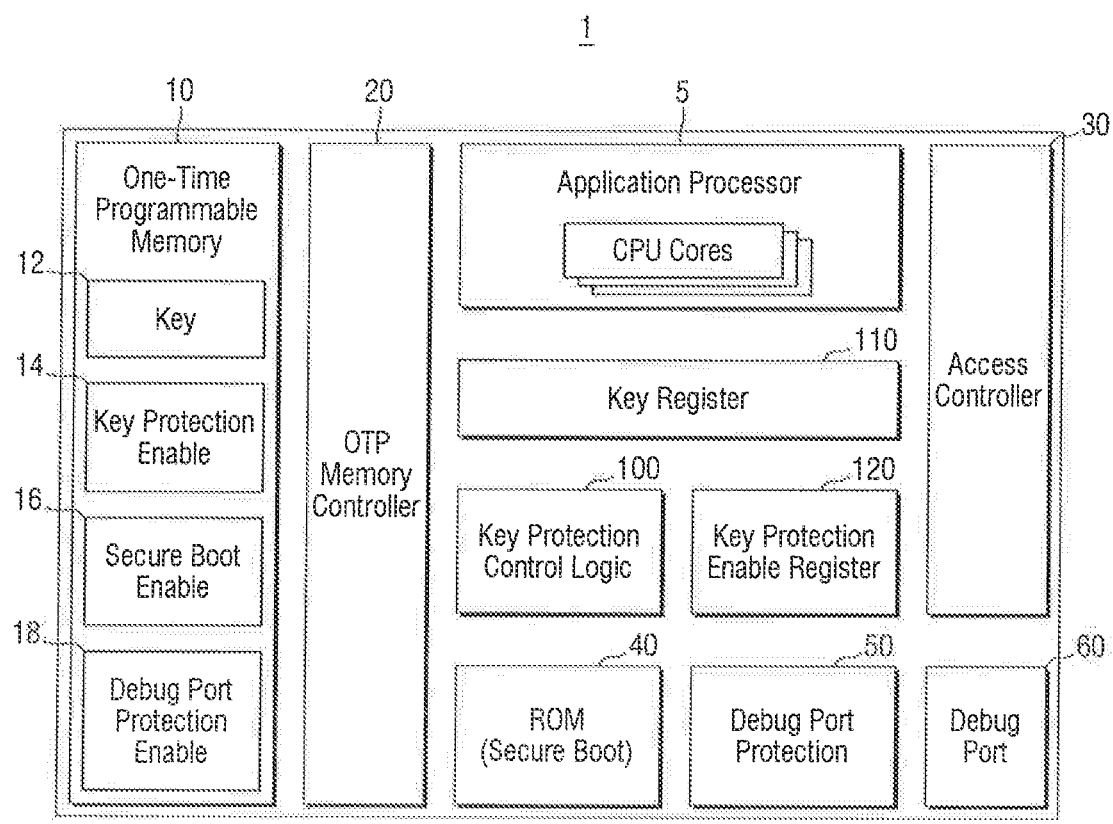
FIG. 1 is a block diagram of a semiconductor device according to an exemplary embodiment of the present disclosure.

Exemplary embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present disclosure provide a scheme that protects a secure key fused in a chip mounted in a semiconductor device from a third party until secure features such as, for example, a secure boot feature and a debug port protection feature, are enabled.

Figure 2:
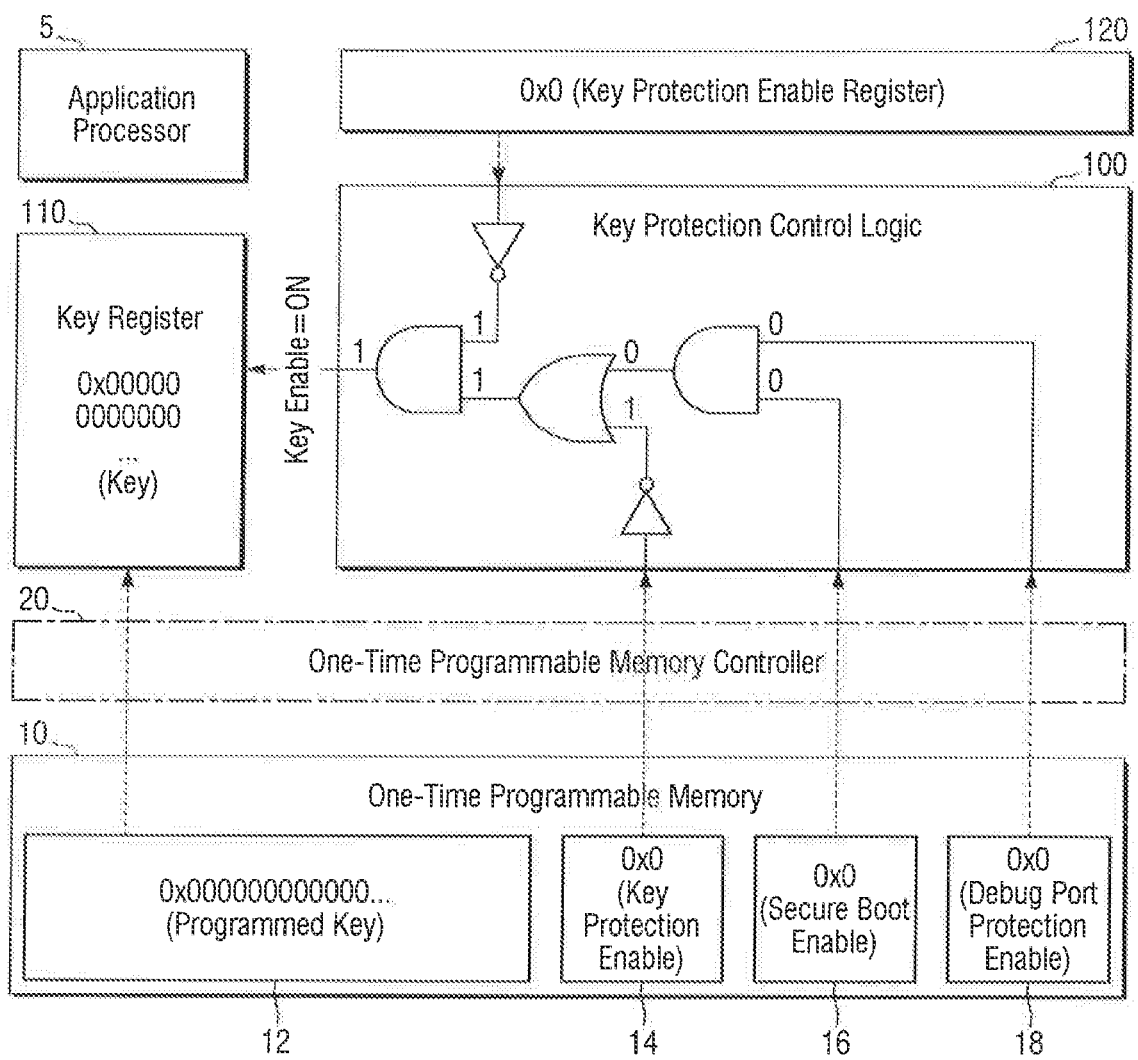
FIG. 2 is a block diagram illustrating a semiconductor device according to an exemplary embodiment of the present disclosure.

FIG. 1 is a block diagram illustrating a semiconductor device according to an exemplary embodiment of the present disclosure. FIG. 2 is a block diagram illustrating a semiconductor device according to an exemplary embodiment of the present disclosure.

Referring to FIGS. 1 and 2, a semiconductor device 1 according to an exemplary embodiment of the present disclosure may include an application processor 5, a one-time programmable (OTP) memory 10, an OTP memory controller 20, an access controller 30, a read-only memory (ROM) 40, a debug port protection logic 50, a debug port 60, a key protection control logic 100, and a key register 110.

In addition, according to exemplary embodiments of the present disclosure, the semiconductor device 1 may further include a key protection enable register 120.

The application processor 5 may control various elements of the semiconductor device 1 and may execute a variety of types of software. For example, the application processor 5 may run secure software for executing only tasks authenticated according to a predetermined criterion, and may run non-secure software for executing tasks that do not need to be authenticated. For example, the application processor 5 may execute a binary, such as a boot image authenticated during the booting of the semiconductor device 1.

According to exemplary embodiments of the present disclosure, the application processor 5 may include, but is not limited to, a plurality of central processing unit (CPU) cores.

In exemplary embodiments, the OTP memory 10 stores a key to be used by the application processor 5 to execute secure software. According to exemplary embodiments of the present disclosure, the key may be permanently programmed into the OTP memory 10 with a predetermined value during a process of fabricating the semiconductor device 1.

According to exemplary embodiments of the present disclosure, the OTP memory 10 includes a key program area 12 and key protection setting areas 14, 16 and 18.

The key program area 12 is an area in which a key to be used for executing the secure software by the application processor 5 is programmed. The software executed by the application processor 5 cannot directly access the key program area 12. To access the key, the software executed by the application processor 5 must use a key register 110, which will be described in further detail below.

The key protection setting areas 14, 16 and 18 are areas in which setting values for protecting the key stored in the key program area 12 are programmed. The key protection setting areas 14, 16 and 18 may respectively store a key protection enable bit, a secure boot enable bit, and a debug port protection enable bit. Thus, the key protection setting area 14 may also be referred to as a key protection enable setting area 14, the key protection setting area 16 may also be referred to as a secure boot enable setting area 16, and the key protection setting area 18 may also be referred to as a debug port protection enable setting area 18.

The key protection control logic 100 determines whether to load the key programmed in the key program area 12 of the OTP memory 10 into the key register 110. Once loaded into the key register 110, the software executed by the application processor 5 can access the key based on the programmed values in the key protection setting areas 14, 16 and 18.

A detailed description regarding the key protection setting areas 14, 16 and 18, and a process of determining whether to load the key into the key register 110 by the key protection control logic 100 based on the programmed values in the key protection setting areas 14, 16 and 18, will be provided below with reference to FIGS. 3 to 7.

The key protection setting areas 14, 16 and 18 cannot be accessed by the software. Rather, the key protection setting areas 14, 16 and 18 can be accessed by the key protection control logic 100, which is implemented as a hardware element.

The OTP memory controller 20 performs the operation of loading the key stored in the OTP memory 10 into the key register 110 based on the determination made by the key protection control logic 100. The OTP memory controller 20 can be controlled only by secure software.

The key register 110 is a hardware interface that can provide the loaded key to the secure software. For example, the secure software may read the key loaded into the key register 110. In addition, the key register 110 cannot be accessed by the debug port 60, which will be described in further detail below.

As described above, the key protection control logic 100 determines whether to load the key stored in the OTP memory 10 into the key register 110 based on the values programmed in the key protection setting areas 14, 16 and 18 of the OTP memory 10.

For example, the key protection control logic 100 may perform one or more logic operations on the setting values stored in the key protection setting areas 14, 16 and 18, and may determine whether to load the key stored in the OTP memory 10 into the key register 110 based on the results of the one or more logic operations.

The access controller 30 blocks access by non-secure software to the key register 110. Further, the access controller 30 blocks access by non-secure software to the elements required to be secured, such as the OTP memory controller 20, the key protection control logic 100, and the key protection enable register 120.

The ROM 40 may store binaries to be executed upon booting of the semiconductor device 1, and may perform signature verification on the binaries. In exemplary embodiments, the ROM 40 may or may not perform the signature verification on the binaries depending on the value of the secure boot enable bit stored in the secure boot enable setting area 16. For example, in an exemplary embodiment, the ROM 40 performs the signature verification on the binaries when the secure boot enable bit stored in the secure boot enable setting area 16 has one value, and the ROM 40 does not perform the signature verification on the binaries when the secure boot enable bit stored in the secure boot enable setting area has another value.

The debug port 60 provides a debug interface to a user. For example, the debug port 60, under the control of the debug port protection logic 50, may allow or prohibit the user's access depending on the value of the debug port enable protection bit stored in the debug port protection enable setting area 18 of the OTP memory 10. For example, in an exemplary embodiment, the debug port 60 allows the user's access when the debug port protection enable bit stored in the debug port protection enable setting area 18 has one value, and the debug port 60 prohibits the user's access when the debug port protection enable bit stored in the debug port protection enable setting area 18 has another value. For example, in exemplary embodiments, the debug port 60, under the control of the debug port protection logic 50, may allow prohibit a user to access the key register 110 depending on the value of the debug port enable protection bit stored in the debug port protection enable setting area 18 of the OTP memory 10.

The key protection enable register 120 may be accessed by secure software. The key protection control logic 100 may determine whether to load the programmed key in the key program area 12 of the OTP memory 10 into the key register 110 based on the programmed value in the key protection enable register 120. For example, when the secure software programs a predetermined value in the key protection enable register 120 that is not a value indicating that access should be granted, the key protection control logic 100 does not load the key stored in the OTP memory 10 into the key register 110. In contrast, when the secure software programs a predetermined value in the key protection enable register 120 that is a value indicating that access should be granted, the key protection control logic 100 loads the key stored in the OTP memory 10 into the key register 110, thus, granting the secure program access to the key.

According to exemplary embodiments of the present disclosure, the key protection enable register 120 is implemented such that is can be altered only once during operation of the semiconductor device 1. For example, the setting value stored in the key protection enable register 120 may be altered only once during the operation of the semiconductor device 1 before the semiconductor device 1 is rebooted.

Hereinafter, an operation of the semiconductor device 1 for preventing a key fused in the OTP memory 10 from leaking before secure features are enabled will be described in detail.

Figure 3:
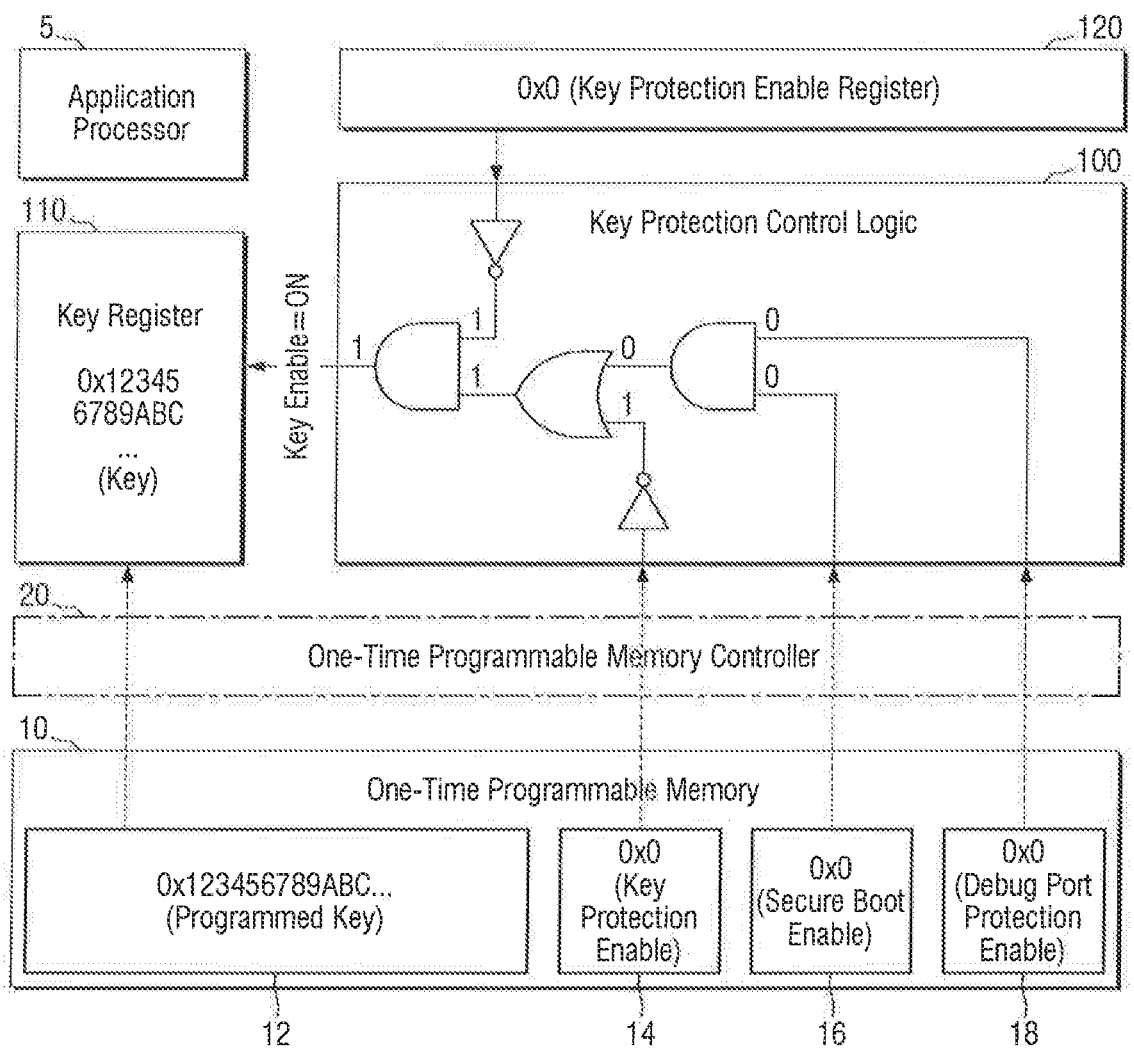
FIG. 3 is a block diagram illustrating a semiconductor device according to an exemplary embodiment of the present disclosure.

FIG. 3 is a block diagram illustrating a semiconductor device according to an exemplary embodiment of the present disclosure.

Referring to FIG. 3, it is assumed that each of the key protection setting areas 14, 16 and 18 of the OTP memory 10 has a first value (e.g., 0) as the default value. In addition, it is assumed that the setting value stored in the key protection enable register 120 also has the first value (e.g., 0) as the default value. It is to be understood that these default values are exemplary and are referred to for convenience of description, and the default values are not limited thereto.

In addition, although the first value and a second value are expressed in binary numbers of 0 and 1 herein, this is merely an implementation referred to for exemplary purposes, and exemplary embodiments are not limited thereto.

For example, in some implementations, the first and second values may be expressed with binary numbers of 1 and 0, respectively. Further, in some implementations, the first value of the key protection enable bit, the first value of the secure boot enable bit, and the first value of the debug port protection enable bit may not be the same value. For example, in exemplary embodiments, when the first value of the key protection enable bit is the binary number 0, the first value of the secure boot enable bit or the first value of the debug port protection enable bit may be the binary number 1.

It is to be understood that herein, when an enable bit stored in the key protection setting areas 14, 16 and 18 of the OTP memory 10, or a setting value stored in the key protection enable register 120, is described as having the default value (e.g., the first value), the enable bit is not programmed. Further, when an enable bit stored in the key protection setting areas 14, 16 and 18 of the OTP memory 10, or a setting value stored in the key protection enable register 120, is described as being programmed, the enable bit is changed from the default value (e.g., the first value) to the second value (e.g., the second value). For convenience of explanation, in the examples described herein, the default value (e.g., the non-programmed value) (e.g., the first value) is 0, and the programmed value (e.g., the second value) is 1. However, exemplary embodiments of the present disclosure are not limited thereto.

Referring back to FIG. 3, in the semiconductor device 1 according to an exemplary embodiment of the present disclosure, the key "0x123456789ABC . . . " is programmed in the key program area 12 of the OTP memory 10. The key "0x123456789ABC . . . " is fused in the OTP memory 10 during the process of fabricating the semiconductor device 1.

According to this exemplary embodiment, the key protection enable bit stored in the key protection setting area 14 of the OTP memory 10 is the first value (e.g., 0), which is the default value. When the key protection enable bit stored in the key protection setting area 14 of the OTP memory 10 is the first value, the key protection control logic 100 makes a determination to load the key stored in the key program area 12 of the OTP memory 10 into the key register 110.

For example, the key protection control logic 100 provides an output signal having the second value (e.g., 1) to the key register 110 so that the key register 110 exposes the key stored in the key program area 12. The output signal of the key protection control logic 100 having the second value corresponds to a signal indicating that the key is loaded into the key register 110, which indicates that the secure software can read the key ("Key Enable=ON").

Accordingly, it can be seen that the key "0x123456789ABC . . . " is loaded in the key register 110 in FIG. 3. That is, in this example, the protection for the key is disabled.

Although FIGS. 2 to 7 illustrate logic circuit diagrams including inverters, AND logic gates, and OR logic gates inside the key protection control logic 100, thus forming a key protection control logic circuit 100 that is a hardware element, the logic circuit diagrams are merely examples for conceptually illustrating the operation of the key protection control logic 100. For example, according to exemplary embodiments, the implementation of the key protection control logic 100 is neither limited to the depicted logic diagrams nor necessarily includes the physically depicted logic circuits in the configurations shown in FIGS. 2 to 7.

Figure 4:
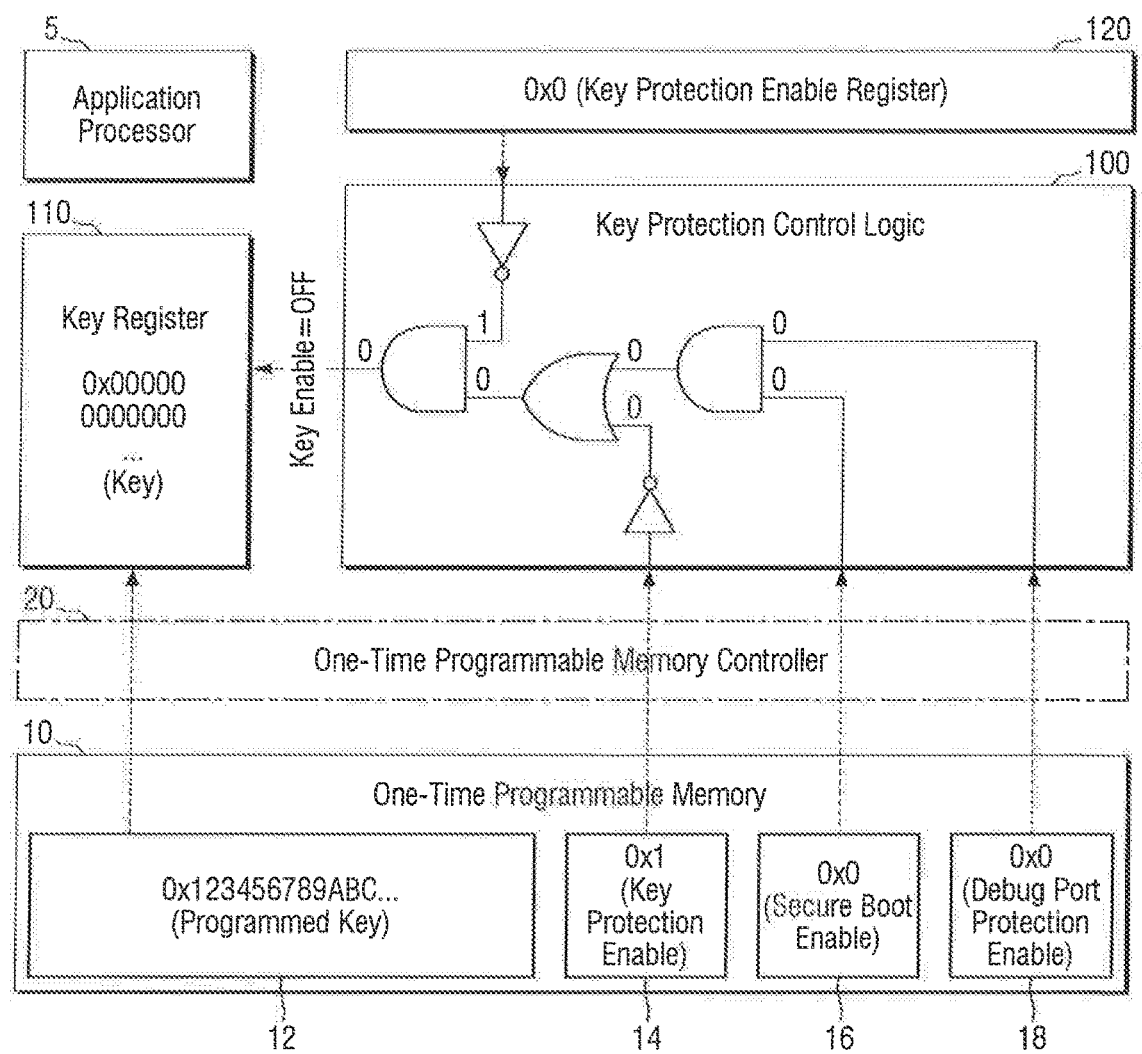
FIG. 4 is a block diagram illustrating a semiconductor device according to an exemplary embodiment of the present disclosure.

FIG. 4 is a block diagram illustrating a semiconductor device according to an exemplary embodiment of the present disclosure.

Referring to FIG. 4, in the semiconductor device 1 according to an exemplary embodiment of the present disclosure, the key protection enable bit stored in the key protection enable setting area 14 of the OTP memory 10 may be programmed with the second value (e.g., 1). The setting values stored in the key protection setting areas 16 and 18 and the key protection enable register 120 maintain their default values.

When the key protection enable bit stored in the key protection enable setting area 14 is the second value (e.g., 1), the key protection control logic 100 makes a determination not to load the key stored in the key program area 12 of the OTP memory 10 into the key register 110.

For example, the key protection control logic 100 provides an output signal having the first value (e.g., 0) to the key register 110 so that the key register 110 does not expose the key stored in the key program area 12. The output signal of the key protection control logic 100 having the first value corresponds to a signal indicating that the key is not loaded into the key register 110, which indicates that the secure software cannot read the key ("Key Enable=OFF").

As a result, it can be seen that the key "0x123456789ABC . . . " programmed in the key program area 12 of the OTP memory 10 of FIG. 4 is not loaded into the key register 110. Thus, in this example, the protection for the key is enabled.

According to exemplary embodiments of the present disclosure, the key protection scheme described herein is realized by implementing the key protection control logic 100 as a hardware element (e.g., a key protection control logic circuit 100 including, for example, logic gates). As a result, exemplary embodiments are capable of completely preventing the software, including even the secure software, from reading the key, resulting in an improvement over conventional semiconductor device key protection schemes. For example, in conventional semiconductor device key protection schemes, a key fused in an OTP memory may be leaked before secure features are enabled. In contrast, according to exemplary embodiments, implementing the key protection control logic 100 as a hardware element (e.g., a hardware circuit) prevents the key fused in the OTP memory 10 from leaking before secure features are enabled. Since, according to exemplary embodiments, the key protection control logic 100 is implemented as a hardware circuit, the key protection control logic 100 may also be referred to herein as a key protection control logic circuit 100.

It is to be understood that although "0x000000000000 . . . " is indicated in the key register 110 in the figures when the protection for the key is enabled, this is merely a conceptual illustration, and the implementation of the key register 110 is not limited thereby. For example, in some implementations, when the protection for the key is enabled, the key register 110 may have a meaningless garbage value instead of "0x000000000000 . . . "

Figure 5:
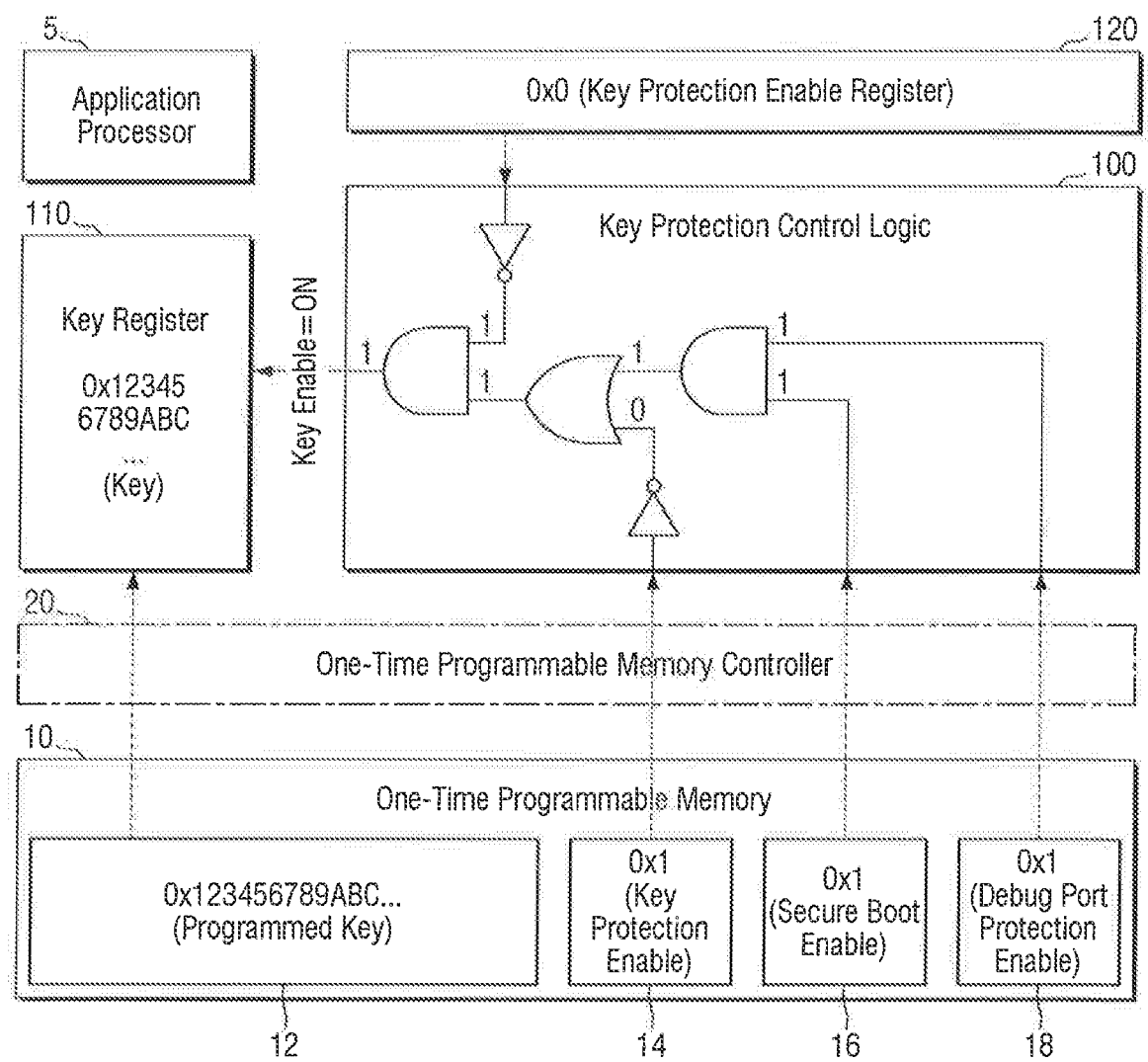
FIG. 5 is a block diagram illustrating a semiconductor device according to an exemplary embodiment of the present disclosure.

FIG. 5 is a block diagram illustrating a semiconductor device according to an exemplary embodiment of the present disclosure.

Referring to FIG. 5, in the semiconductor device 1 according to an exemplary embodiment of the present disclosure, the key protection enable bit stored in the key protection enable setting area 14, the secure boot enable bit stored in the secure boot enable setting area 16, and the debug port protection enable bit stored in the debug port protection enable setting area 18 of the OTP memory 10 may be programmed with the second value (e.g., 1). The setting value stored in the key protection enable register 120 maintains the default value.

When the key protection enable bit and the secure boot enable bit are programmed in the key protection enable setting area 14 and the secure boot enable setting area 16, respectively, the key protection control logic 100 recognizes that the secure boot feature, which is one secure feature from among a plurality of secure features, is enabled. Accordingly, the key stored in the key program area 12 of the OTP memory 10 may be loaded into the key register 110.

In addition, when the key protection enable bit and the debug port protection enable bit are programmed in the key protection enable setting area 14 and the debug port protection enable setting area 18, respectively, the key protection control logic 100 recognizes that the debug port protection feature, which is one secure feature from among the plurality of secure features, is enabled. Accordingly, the key stored in the key program area 12 of the OTP memory 10 may be loaded into the key register 110.

For example, as shown in FIG. 5, the key protection control logic 100 may perform a first logic operation on the secure boot enable bit stored in the secure boot enable setting area 16 and the debug port protection enable bit stored in the debug port protection enable setting area 18, and may perform a second logic operation on a result of the first logic operation and the key protection enable bit stored in the key protection enable setting area 14, to determine whether to load the key stored in the key program area 12 of the OTP memory 10 into the key register 110 based on a result of the second logic operation. That is, the key protection control logic 100 may check that both the secure boot feature and the debug port protection feature are enabled, and may allow the secure software to access the key when both of these secure features are enabled.

In exemplary embodiments of the present disclosure, the debug port protection feature may, for example, block the debug port permanently or temporarily (e.g., may prohibit use of the debug port permanently or temporarily). When the debug port protection feature blocks the debug port temporarily, user authentication, including, for example, secure authentication (secure JTAG), may be applied.

In exemplary embodiments of the present disclosure, the first logic operation may include, but is not limited to, an AND logic operation performed by an AND logic gate, and the second logic operation may include, but is not limited to, an OR logic operation performed by an OR logic gate.

For example, referring still to FIG. 5, the secure boot enable bit stored in the secure boot enable setting area 16 and the debug port protection enable bit stored in the debug port protection enable setting area 18 have the second value (e.g., 1), and the key protection control logic 100 performs an AND logic operation on the secure boot enable bit and the debug port protection enable bit.

The key protection control logic 100 then performs an OR logic operation on the result of the AND logic operation (e.g., 1) and the inverted value of the key protection enable bit having the second value (e.g., 1).

Then, the key protection control logic 100 performs an AND logic operation on the result of the OR logic operation (e.g., 1) and the inverted value stored in the key protection enable register 120 (e.g., 1), and provides an output signal having the second value (e.g., 1) to the key register 110 depending on the result of the AND logic operation (e.g., 1) so that the key register 110 exposes the key stored in the key program area 12.

As a result, it can be seen that the key "0x123456789ABC . . . " programmed in the key program area 12 of the OTP memory 10 of FIG. 5 is loaded into the key register 110. That is, this example shows that the protection for the key is disabled but the security feature is already working.

Thus, in exemplary embodiments, the semiconductor device 1 executes only the allowed software and prohibits the use of the debug port 60 in accordance with the key protection scheme implemented by the key protection control logic 100, which is implemented as a hardware element, thereby safely protecting the key stored in the OTP memory 10.

Figure 6:
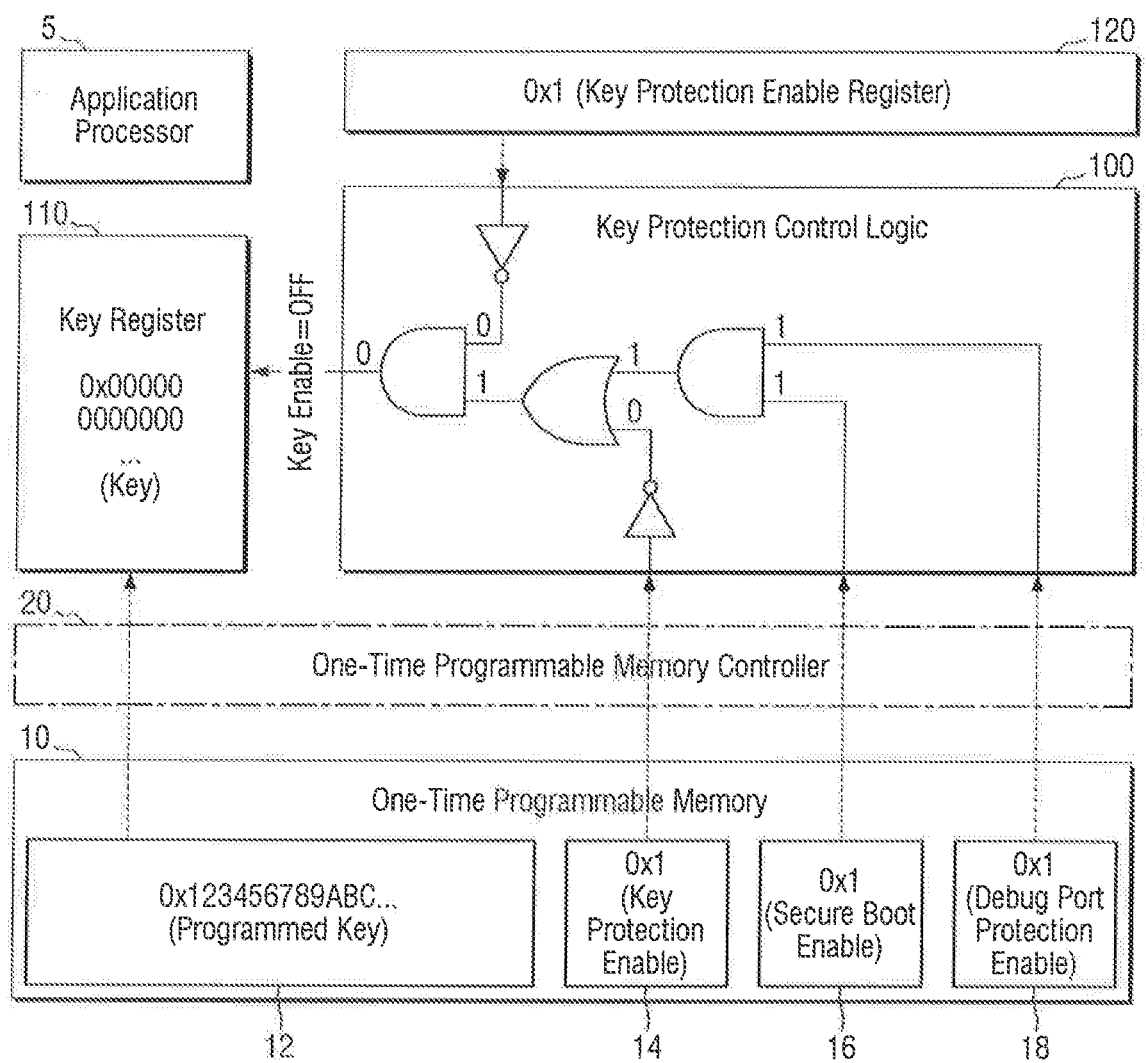
FIG. 6 is a block diagram illustrating a semiconductor device according to an exemplary embodiment of the present disclosure.

FIG. 6 is a block diagram illustrating a semiconductor device according to an exemplary embodiment of the present disclosure.

Referring to FIG. 6, in the semiconductor device 1 according to an exemplary embodiment of the present disclosure, the key protection enable register 120, as well as the key protection enable bit stored in the key protection enable setting area 14, the secure boot enable bit stored in the secure boot enable setting area 16, and the debug port protection enable bit stored in the debug port protection enable setting area 18 of the OTP memory 10, may be programmed with the second value (e.g., 1).

When the key protection enable register 120 is programmed, even though the debug port protection feature from among the secure features is enabled, the key protection control logic 100 does not load the key stored in the key program area 12 of the OTP memory 10 into the key register 110.

For example, the key protection control logic 100 may perform a first logic operation on the secure boot enable bit stored in the secure boot enable setting area 16 and the debug port protection enable bit stored in the debug port protection enable setting area 18, may perform a second logic operation on the result of the first logic operation and the key protection enable bit stored in the key protection enable setting area 14, and may perform a third logic operation on the result of the second logic operation and the setting value provided from the key protection enable register 120, to determine whether to load the key stored in the key program area 12 of the OTP memory 10 into the key register 110 based on a result of the third logic operation. Thus, in an exemplary embodiment, even after the key protection control logic 100 determines that both the secure boot feature and the debug port protection feature have been enabled, the key protection control logic 100 may prohibit the secure software from accessing the key if desired.

In exemplary embodiments of the present disclosure, the first logic operation and the third logic operation may include, but are not limited to, an AND logic operation performed by an AND logic gate, while the second logic operation may include, but is not limited to, an OR logic operation performed by an OR logic gate.

For example, referring still to FIG. 6, the secure boot enable bit stored in the secure boot enable setting area 16 and the debug port protection enable bit stored in the debug port protection enable setting area 18 have the second value (e.g., 1), and the key protection control logic 100 performs an AND logic operation on these bits.

The key protection control logic 100 then performs an OR logic operation on the result of the AND logic operation (e.g., 1) and the inverted value of the key protection enable bit stored in the key protection enable setting area 14 having the second value (e.g., 1).

The key protection control logic 100 then performs an AND logic operation on the result of the OR logic operation (e.g., 1) and the inverted value stored in the key protection enable register 120 having the second value (e.g., 1).

Then, the key protection control logic 100 provides an output signal having the first value (e.g., 0) to the key register 110 depending on the result of the AND logic operation (e.g., 0) so that the key register 110 does not expose the key stored in the key program area 12.

As a result, it can be seen that the key "0x123456789ABC . . . " programmed in the key program area 12 of the OTP memory 10 of FIG. 6 is not loaded into the key register 110. That is, this example shows that the protection for the key is enabled even though the secure feature is working, if desired.

According to exemplary embodiments of the present disclosure, the key protection enable register 120 is implemented such that is can be altered only once during operation of the semiconductor device 1. For example, the setting value stored in the key protection enable register 120 may be altered only once during the operation of the semiconductor device 1 before the semiconductor device 1 is rebooted.

According to exemplary embodiments of the present disclosure, the key protection scheme described herein is realized by the key protection control logic 100 being implemented as a hardware element (e.g., a key protection control logic circuit 100 including, for example, a plurality of logic gates). As a result, after the semiconductor device 1 uses the key stored in the OTP memory 10 at the time of booting, the protection for the key is enabled so that the key is no longer able to be used until the semiconductor device 1 is reset. As a result, the protection level of the key stored in the OTP memory 10 is increased.

Figure 7:
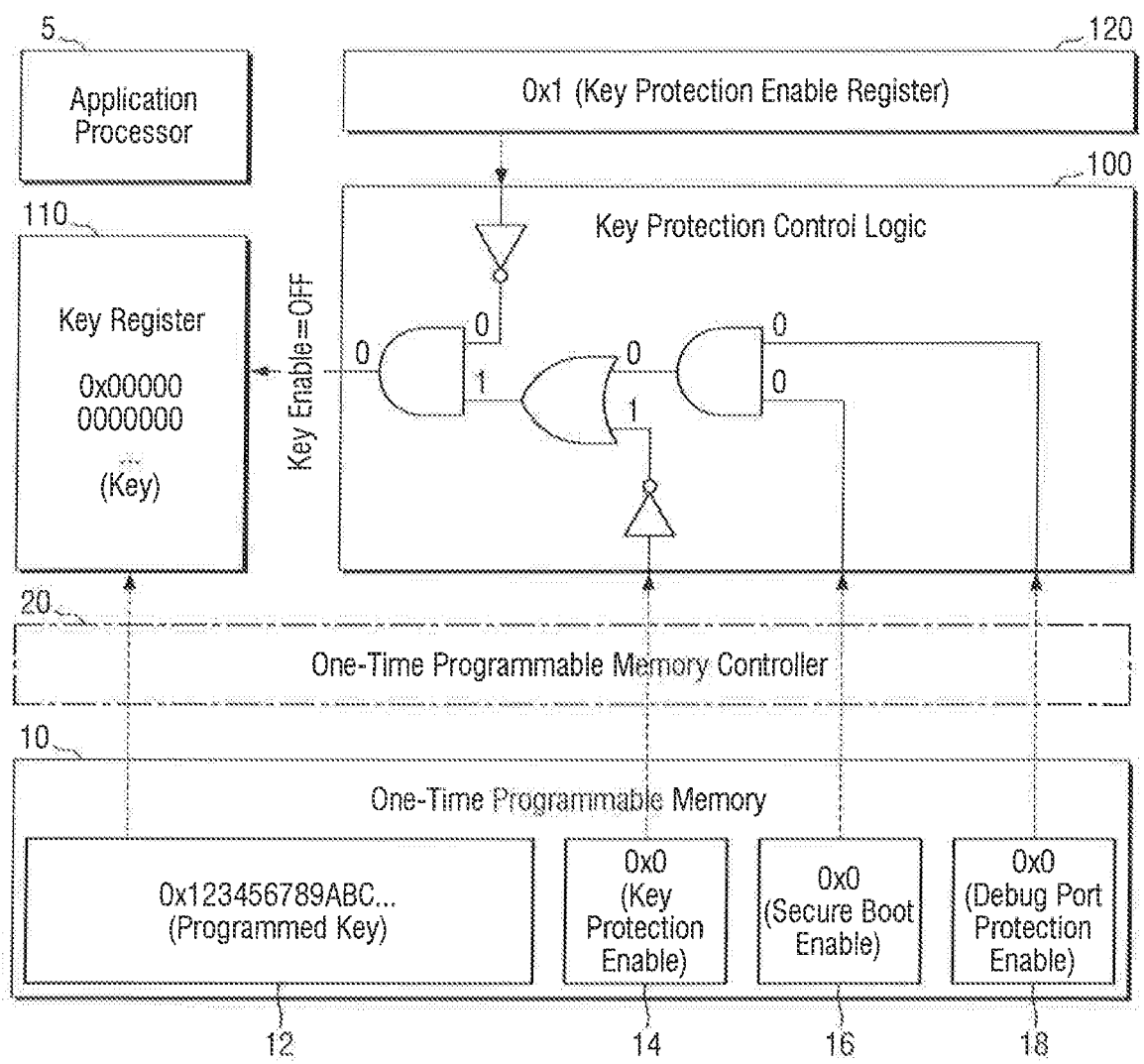
FIG. 7 is a block diagram illustrating a semiconductor device according to an exemplary embodiment of the present disclosure.

FIG. 7 is a block diagram illustrating a semiconductor device according to an exemplary embodiment of the present disclosure.

Referring to FIG. 7, in the semiconductor device 1 according to an exemplary embodiment of the present disclosure, the key protection enable bit stored in the key protection enable setting area 14, the secure boot enable bit stored in the secure boot enable setting area 16, and the debug port protection enable bit stored in the debug port protection enable setting area 18 of the OTP memory 10 all may be the first value (e.g., 0), which is the default value. Thus, this example is the same as the example shown in FIG. 3 in which the protection for the key is disabled.

In this example, even though the key protection enable bit stored in the key protection enable setting area 14, the secure boot enable bit stored in the secure boot enable setting area 16, and the debug port protection enable bit stored in the debug port protection enable setting area 18 of the OTP memory 10 are not programmed, the key protection enable register 120 may be programmed with the second value (e.g., 1) upon the user's request, to enable the protection for the key.

As described above, the key protection control logic 100, which determines whether to protect the key based on the key protection enable bit, the secure boot enable bit, and the debug port protection enable bit, is a hardware element, whereas the key protection enable register 120 is an element that is accessed by secure software and whose contents may be altered.

Thus, the protection for the key can be enabled according to the policy of the secure software regardless of the secure features of the semiconductor device 1.

According to exemplary embodiments of the present disclosure, the key protection enable register 120 is implemented such that is can be altered only once during operation of the semiconductor device 1. For example, the setting value stored in the key protection enable register 120 may be altered only once during the operation of the semiconductor device 1 before the semiconductor device 1 is rebooted.

A determination of whether to protect the key may be made under the control of the secure software. For example, after a user uses the key stored in the OTP memory 10 only at a particular time point, the protection for the key is enabled so that the key is no longer able to be used until the semiconductor device 1 is reset, thereby protecting the key stored in the OTP memory 10.

Figure 8:
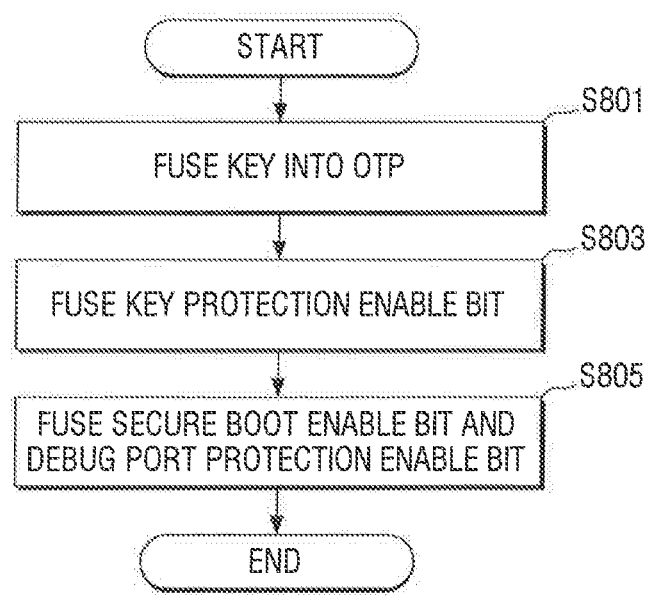
FIG. 8 is a flowchart illustrating a method of operating a semiconductor device according to an exemplary embodiment of the present disclosure.

FIG. 8 is a flowchart illustrating a method of operating a semiconductor device according to an exemplary embodiment of the present disclosure.

Referring to FIG. 8, a method of operating the semiconductor device 1 according to an exemplary embodiment of the present disclosure starts with fusing a key to be used by the application processor 5 for executing secure software in the key program area 12 of the OTP memory 10 (S801).

Subsequently, the method includes fusing a key protection enable bit in the key protection enable setting area 14 of the OTP memory 10 (S803). As a result, protection for the key can be enabled.

Subsequently, the method includes fusing a secure boot enable bit in the secure boot enable setting area 16 and fusing a debug port protection enable bit in the debug port protection enable setting area 18 of the OTP memory 10 (S805). Accordingly, when both the secure boot feature and the debug port protection feature are enabled, the secure software may be allowed to access the key.

Figure 9:
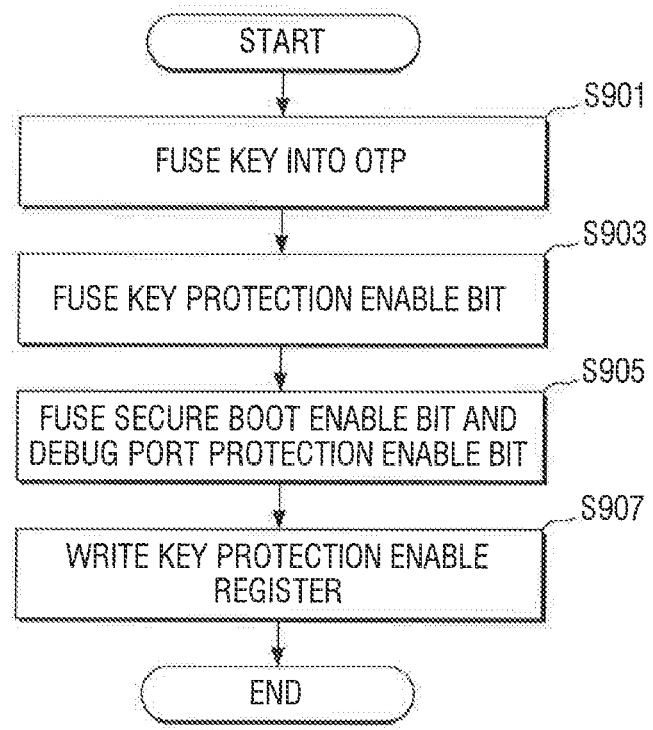
FIG. 9 is a flowchart illustrating a method of operating a semiconductor device according to an exemplary embodiment of the present disclosure.

FIG. 9 is a flowchart illustrating a method of operating a semiconductor device according to an exemplary embodiment of the present disclosure.

Referring to FIG. 9, a method of operating the semiconductor device 1 according to an exemplary embodiment of the present disclosure starts with fusing a key to be used by the application processor 5 for executing secure software in the key program area 12 of the OTP memory 10 (S901).

Subsequently, the method includes fusing a key protection enable bit in the key protection enable setting area 14 of the OTP memory 10 (S903). As a result, protection for the key can be enabled.

Subsequently, the method includes fusing a secure boot enable bit in the secure boot enable setting area 16 and fusing a debug port protection enable bit in the debug port protection enable setting area 18 of the OTP memory 10 (S905). Accordingly, when both the secure boot feature and the debug port protection feature are enabled, the secure software may be allowed to access the key.

Subsequently, the method includes programming the key protection enable register 120 under the control of the security software (S907). Accordingly, even after it is has been determined that both the secure boot feature and the debug port protection feature are enabled, the secure software may still be prohibited from accessing the key if desired.

Figure 10:
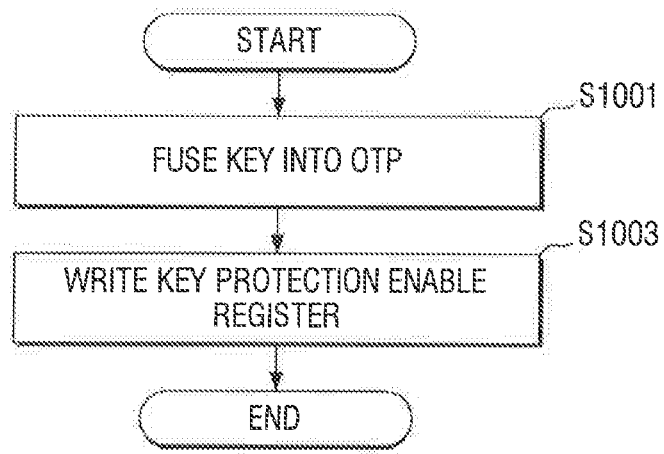
FIG. 10 is a flowchart illustrating a method of operating a semiconductor device according to an exemplary embodiment of the present disclosure.

FIG. 10 is a flowchart illustrating a method of operating a semiconductor device according to an exemplary embodiment of the present disclosure.

Referring to FIG. 10, a method of operating the semiconductor device 1 according to an exemplary embodiment of the present disclosure starts with fusing a key to be used by the application processor 5 for executing secure software in the key program area 12 of the OTP memory 10 (S1001).

Subsequently, the method includes programming the key protection enable register 120 under the control of the secure software (S1003). By doing so, protection for the key can be enabled depending on the policy of the secure software regardless of the secure feature of the semiconductor device 1.

For example, according to the methods described above with reference to FIGS. 8 to 10, one or more setting values are received from the key protection setting areas 14, 16 and 18 of the OTP memory 10, one or more logic operations are performed on the one or more setting values, and it is determined whether to load the key stored in the OTP memory 10 based on the results of the one or more logic operations. The schemes implemented to accomplish this are described in detail above with reference to FIGS. 3 to 7.

According to the key protection schemes provided by the key protection control logic 100 according to the exemplary embodiments of the present disclosure described herein, software, including even secure software, may be completely prevented from reading the key when desired.

Further, since the semiconductor device 1 can execute only the allowed software and can prohibit the use of the debug port 60 in accordance with the above schemes, the key stored in the OTP memory 10 can be safely protected.

Moreover, after the semiconductor device 1 uses the key stored in the OTP memory 10 at the time of booting, protection for the key is enabled so that the key is no longer able to be used until the semiconductor device 1 is reset, thereby further increasing the protection level of the key stored in the OTP memory 10.

Additionally, after a user uses the key stored in the OTP memory 10 at a particular time point, protection for the key is enabled so that the key is no longer able to be used until the semiconductor device 1 is reset, thereby safely protecting the key stored in the OTP memory 10.

As a result, when a chip is distributed to another place after the process of fusing the chip is completed, or when a device is subsequently developed using the chip, exemplary embodiments of the present disclosure effectively prevent the key fused in the chip from being read without permission and leaked by an unauthorized third party until the secure features such as the secure boot feature and the debug port protection feature are enabled.

As is traditional in the field of the present disclosure, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A semiconductor device, comprising:
    a one-time programmable (OTP) memory comprising a key program area and a plurality of key protection setting areas, wherein a key is stored in the key program area, and a plurality of setting values that protect the key stored in the key program area are programmed in the key protection setting areas;
a key register configured to load the key stored in the OTP memory, wherein the key is accessible to secure software when the key is loaded into the key register; and
a key protection control logic circuit configured to load the key stored in the OTP memory into the key register based on the setting values programmed in the key protection setting areas of the OTP memory.

2. The semiconductor device of claim 1,
wherein the key protection setting areas comprise a key protection enable setting area that stores a key protection enable bit,
wherein the key protection control logic circuit does not load the key stored in the OTP memory into the key register when the key protection enable bit is programmed.

3. The semiconductor device of claim 2,
wherein the key protection setting areas further comprise a secure boot enable setting area that stores a secure boot enable bit,
wherein the semiconductor device further comprises:
a read-only memory (ROM) configured to perform signature verification on a binary executed at booting, wherein the ROM performs or does not perform the signature verification depending on a value of the secure boot enable bit.

4. The semiconductor device of claim 3, wherein the key protection control logic circuit loads the key stored in the OTP memory into the key register when the key protection enable bit and the secure boot enable bit are programmed.

5. The semiconductor device of claim 2,
wherein the key protection setting areas further comprise a debug port protection enable setting area that stores a debug port protection enable bit,
wherein the semiconductor device further comprises:
a debug port configured to provide a debug interface to a user, wherein the debug port allows or prohibits access by the user depending on a value of the debug port protection enable bit.

6. The semiconductor device of claim 5, wherein the key protection control logic circuit loads the key stored in the OTP memory into the key register when the key protection enable bit and the debug port protection enable bit are programmed.

7. The semiconductor device of claim 1, further comprising:
a key protection enable register, wherein a setting value is written to the key protection enable register by the secure software,
wherein the key protection control logic circuit does not load the key stored in the OTP memory into the key register when the key protection enable register is programmed.

8. The semiconductor device of claim 7, wherein the setting value stored in the key protection enable register is alterable only once during operation of the semiconductor device.

9. A semiconductor device, comprising:
a one-time programmable (OTP) memory comprising a key program area and a plurality of key protection setting areas,
wherein a key is stored in the key program area, and a plurality of setting values that protect the key stored in the key program area are stored in the key protection setting areas;
a key register configured to load the key stored in the OTP memory, wherein the key is accessible to secure software when the key is loaded into the key register; and
a key protection control logic circuit configured to perform one or more logic operations on the setting values stored in the key protection setting areas of the OTP memory,
wherein the key protection control logic circuit determines whether to load the key stored in the OTP memory into the key register based on a result of performing the one or more logic operations.

10. The semiconductor device of claim 9,
wherein the key protection setting areas comprise a key protection enable setting area that stores a key protection enable bit,
wherein the key protection control logic circuit causes the key stored in the OTP memory to be loaded into the key register when the key protection enable bit has a first value,
wherein the key protection control logic circuit causes the key stored in the OTP memory to not be loaded into the key register when the key protection enable bit has a second value.

11. The semiconductor device of claim 10,
wherein the key protection setting areas further comprise a secure boot enable setting area that stores a secure boot enable bit, and a debug port protection enable setting area that stores a debug port protection enable bit,
wherein the semiconductor device further comprises:
a read-only memory (ROM) configured to perform signature verification on a binary executed at booting, wherein the ROM performs or does not perform the signature verification depending on a value of the secure boot enable bit; and
a debug port configured to provide a debug interface to a user, wherein the debug port allows or prohibits access by the user depending on a value of the debug port protection enable bit.

12. The semiconductor device of claim 11,
wherein the key protection control logic circuit performs a first logic operation on the secure boot enable bit and the debug port protection enable bit, and performs a second logic operation on a result of the first logic operation and the key protection enable bit,
wherein the key protection control logic circuit determines whether to load the key stored in the OTP memory into the key register based on a result of the second logic operation.

13. The semiconductor device of claim 12, further comprising:
a key protection enable register, wherein a setting value is written to the key protection enable register by the secure software,
wherein the key protection control logic circuit performs a third logic operation on the result of the second logic operation and the value written in the key protection enable register,
wherein the key protection control logic circuit determines whether to load the key stored in the OTP memory into the key register based on a result of the third logic operation.

14. The semiconductor device of claim 13, wherein the setting value stored in the key protection enable register is alterable only once during operation of the semiconductor device.

15. The semiconductor device of claim 9, further comprising:
a key protection enable register, wherein a setting value is written to the key protection enable register by the secure software,
wherein the key protection control logic circuit does not load the key stored in the OTP memory into the key register when the key protection enable register is programmed.

16. A method of operating a semiconductor device, the method comprising:
receiving, by a key protection control logic circuit included in the semiconductor device, one or more setting values from one or more key protection setting areas of a one-time programmable (OTP) memory included in the semiconductor device;
performing, by the key protection control logic circuit, one or more logic operations on the one or more setting values; and
determining, by the key protection control logic circuit, whether to load a key stored in the OTP memory into a key register included in the semiconductor device based on a result of performing the one or more logic operations.

17. The method of claim 16,
wherein the one or more setting values comprise a key protection enable bit,
wherein determining whether to load the key stored in the OTP memory into the key register comprises:
causing the key to be loaded into the key register when the key protection enable bit has a first value, and
causing the key to not be loaded into the key register when the key protection enable bit has a second value.

18. The method of claim 17,
wherein the one or more setting values further comprise a secure boot enable bit and a debug port protection enable bit,
wherein performing the one or more logic operations comprises performing a first logic operation on the secure boot enable bit and the debug port protection enable bit, and subsequently performing a second logic operation on a result of the first logic operation and the key protection enable bit,
wherein determining whether to load the key stored in the OTP memory into the key register is based on a result of the second logic operation.

19. The method of claim 18, further comprising:
receiving a setting value from a key protection enable register included in the semiconductor device, wherein the setting value is written to the key protection enable register by secure software,
wherein performing the one or more logic operations further comprises performing a third logic operation on a result of the second logic operation and the setting value received from the key protection enable register,
wherein determining whether to load the key stored in the OTP memory into the key register is based on a result of the third logic operation.

20. The method of claim 16, further comprising:
receiving a setting value from a key protection enable register included in the semiconductor device, wherein the setting value is written to the key protection enable register by secure software,
wherein determining whether to load the key stored in the OTP memory into the key register comprises:
causing the key to not be loaded into the key register when the setting value received from the key protection enable register has a programmed value instead of a default value.

* * * * *